(12) United States Patent  
Nakao

(10) Patent No.: US 8,499,058 B2  
(45) Date of Patent: Jul. 30, 2013

(54) FILE TRANSFER SYSTEM AND FILE TRANSFER METHOD

(75) Inventor: Akihiko Nakao, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 288 days.

(21) Appl. No.: 12/841,528

(22) Filed: Jul. 22, 2010

(65) Prior Publication Data

US 2011/0022684 A1  Jan. 27, 2011

(30) Foreign Application Priority Data

Jul. 24, 2009  (JP) ................................. 2009-173748

(51) Int. Cl.
*G06F 15/16*  (2006.01)

(52) U.S. Cl.
USPC .............................. 709/219; 709/203; 370/473

(58) Field of Classification Search
USPC .. 709/219, 203, 214, 215, 217, 234; 370/329, 370/343, 345, 442, 389, 473, 260, 347
See application file for complete search history.

(56) References Cited

U.S. PATENT DOCUMENTS

| 7,027,520 | B2 * | 4/2006 | Pugel ............................. 375/260 |
| 7,051,357 | B2 * | 5/2006 | Carr .............................. 725/110 |
| 2003/0085997 | A1 * | 5/2003 | Takagi et al. .................. 348/143 |
| 2003/0099256 | A1 * | 5/2003 | Feinberg ........................ 370/473 |
| 2006/0189352 | A1 * | 8/2006 | Nagai et al. ................... 455/561 |
| 2007/0130584 | A1 * | 6/2007 | Wolf .............................. 725/46 |
| 2010/0100640 | A1 |   4/2010 | Nakao |

FOREIGN PATENT DOCUMENTS

| JP | 2006-303652 | 11/2006 |
| JP | 2006-528472 | 12/2006 |
| JP | 2007-251350 | 9/2007 |

OTHER PUBLICATIONS

Office Action issued May 31, 2011, in Japanese Patent Application No. 2009-173748 (with English-language translation).

* cited by examiner

*Primary Examiner* — Ruolei Zong
(74) *Attorney, Agent, or Firm* — Oblon, Spivak, McClelland, Maier & Neustadt, L.L.P.

(57) ABSTRACT

According to an embodiment, a file transfer system and a file transfer method to transfer an MXF file are provided. A source server performs parallel transfer of data pieces of an MXF file divided by partition packs (PPs) sequentially from the beginning, by using multiple transmitters to a recording server through multiple channels included in a network. The recording server sequentially reads the data pieces divided by the PPs from buffers, and writes and records the data pieces to a storage unit.

2 Claims, 6 Drawing Sheets

FILE TRANSFER SYSTEM AND FILE TRANSFER METHOD

CROSS-REFERENCE TO RELATED APPLICATION

This application is based upon and claims the benefit of priority from the prior Japanese Patent Application No. 2009-173748, filed on Jul. 24, 2009, the entire materials of which are incorporated herein by reference.

FIELD

Embodiments described herein relate generally to a file transfer system and a file transfer method.

BACKGROUND

In recent years, services of providing video information from web servers on the Internet have been widely used. To receive these services, users download the video information from the web servers by using their own terminals. Since a long time is required to download data, there has been developed a method of allowing a terminal to download data from a server at high speed by using multiple paths as similar to parallel transfer of data between computers (For example, Japanese Patent Application Publication No. 2002-215497).

Meanwhile, studies have also been made on a method of performing parallel transfer of content between servers of studios in a broadcasting station or between a server in a center station and a server in a local station to transfer the content at high speed. The video data, however, is compressed and encoded. Thus, the video data having such nature requires a receiver to perform complicated processing for reconstructing the data frame when a transmitter simply divides the video data into pieces in order to perform the parallel transfer of the video data. For this reason, the parallel transfer of video data has not been carried out in practice.

In recent broadcasting stations, files of content data have been stored in program servers. In this respect, the SMPTE (Society of Motion Picture and Television Engineers) has defined MXF (Material eXchange Format) standards as a unified format for exchanging video and audio data files, and the broadcasting stations have introduced a technique of exchanging stream data of broadcast content in conformity with the MXF standards.

Stream data of broadcast content compressed and encoded in conformity with standards such as MPEG2 are written and stored as MXF files in a storage apparatus, or are transferred between servers and the like. In order to play or transfer stream data from halfway, it is necessary to analyze the structure of the MXF file, detect the information on the head position of each frame or GOP (group of pictures), and set processing and procedure which enable reconstruction of the structure of the file. As a result, a problem arises that such setting makes the processing of parallel transfer of content data complicated.

DETAILED DESCRIPTION

Figure 1:
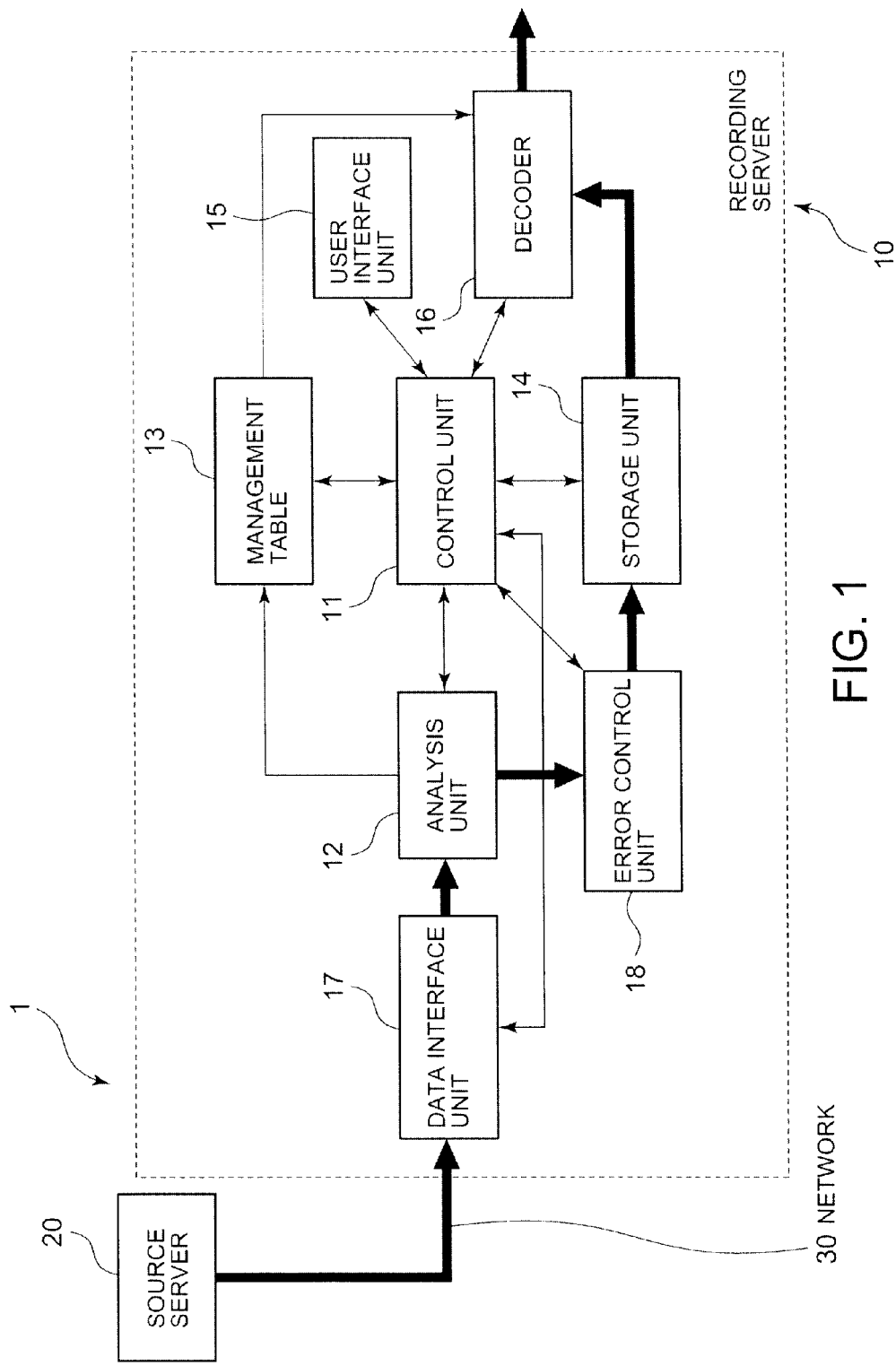
FIG. 1 is a functional block diagram for explaining an operation of a file transfer system according to an embodiment.

According to the embodiment, a file transfer system has a network, a source server and a recording server. The network has first to n-th (n is an integer of 2 or more) transmission channels. The source server has a source server storage unit to store MXF files each of which is broadcast content and includes data pieces partitioned by partition packs (hereinafter, abbreviated as PPs), and including a transmission unit having first to n-th transmitters respectively connected to the first to n-th transmission channels in the network, the source server configured to sequentially read the PPs and following data pieces of the MXF file from the source server storage unit, and allocate the read PPs and following data pieces to the first to n-th transmitters in this order, and to perform parallel transfer of the read PPs and following data pieces by use of the transmission unit through the first to n-th transmission channels.

The recording server has a recording server storage unit, and a receiving unit having first to n-th receivers respectively connected to the first to n-th transmission channels, the recording server configured to receive the PPs and following data pieces, which are transmitted by the first to n-th transmitters, at the first to n-th receivers, respectively, and to write the PPs and following data pieces received at the receiving unit to the recording server storage unit in order of the first to n-th receivers.

A file transfer method for a file transfer system of the embodiment is a file transfer method for a file transfer system to transfer an MXF file of broadcast content from a source server to a recording server through a network. The method includes: using the network including first to n-th (n is an integer of 2 or more) transmission channels; using a source server including a source server storage unit to store MXF files each of which is broadcast content and includes data pieces partitioned by partition packs (hereinafter, abbreviated as PPs), the source server including a transmission unit having first to n-th transmitters respectively connected to the first to n-th transmission channels in the network; using a recording server including a recording server storage unit, and a receiving unit having first to n-th receivers respectively connected to the first to n-th transmission channels; sequentially reading the PPs and following data pieces of the MXF file from the source server storage unit; allocating the read PPs and following data pieces to the first to n-th transmitters, respectively, in this order; transferring the read PPs and following data pieces in parallel from the transmission unit through the first to n-th transmission channels in the network; receiving the PPs and following data pieces, which are transmitted by the first to n-th transmitters, at the first to n-th receivers, respectively; and writing the PPs and following data pieces, which are received by the receiving unit, to the recording server storage unit in order of the first to n-th receivers.

Embodiments will be described with reference to the drawings.

Embodiments

FIG. 1 is a functional block diagram for explaining an operation of a file transfer system according to an embodiment.

A file transfer system 1 includes a source server 20, a network 30, and a recording server 10. The source server 20 transmits a MXF file of broadcast content through the network 30 by using FTP (File Transfer Protocol). The recording server 10 stores broadcast content received through the network 30. The network 30 supports file transfer in FTP protocol, and a typical example usable for the network 30 is a fast IP network.

The recording server 10 includes a control unit 11, an analysis unit 12, a management table 13, a storage unit 14, a user interface unit 15, a decoder 16, a data interface unit 17, and an error control unit 18, which are connected to each other with connection means such as an internal bus (unillustrated). The user interface unit 15 is used by an operator to input and output control information.

The source server 20 has the same configuration as the recording server 10 basically. A functional block diagram of the source server 20 is the same as that of the recording server 10, and therefore the description thereof is omitted.

The source server 20 reads an MXF file of broadcast content from the storage unit 14, and transmits the MXF file to the recording server 10 through the network 30 by using the data interface unit 17. Then, the recording server 10 receives the MXF file through the network 30 by using the data interface unit 17, writes the MXF file to the storage unit 14 and thus stores the MXF file.

The servers 10 and 20 have the same configuration. It is a user who decides which server is to operate as the source server and which server is to operate as the recording server. For the purpose of defining each of the servers 10 and 20 as the source server or the recording server, the user inputs a command from the user interface unit 15 to designate a program to be executed by the control unit 11.

Units included in each of the servers will be described below. The following shows explanation of the recording server 10.

The control unit 11 monitors the internal bus and integrally controls operations of the analysis unit 12, the management table 13, the storage unit 14, the user interface unit 15, the decoder 16, the data interface unit 17, and the error control unit 18.

The user interface unit 15 is input-output means including a mouse, a keyboard, a display panel and the like. The operator inputs commands and data on the user interface unit 15. The user interface unit 15 is used, for example, to input an instruction to cut out a desired portion from broadcast content, to input a parameter for broadcast content transfer, to set address information of the server, or to make a network channel setting. In addition, the user interface unit 15 also displays an operation state of the recording server 10.

The data interface unit 17 is a unit configured to transmit a command to the source server 20 and to receive content from the source server 20 through the network 30. The data interface unit 17 receives packets of a file from the network 30.

The data interface unit 17 receives a file designated by the control unit 11, from the source server 20 through the network 30, and outputs the file to the internal bus. The data interface unit 17 not only receives an MXF file from the head position from the source server 10, but also receives data from a position forwarded by a designated number of bytes from the head position of the file, for example, under the control of the control unit 11 according to a command and data inputted from the user interface unit 15.

The analysis unit 12 receives content from the data interface unit 17 through the internal bus, and analyses the content of the data. The analysis unit 12 stores, as analyzed each of positions and each of data sizes of Partition Pack information, Index Table Segment information, Random Index Pack information related to the detected video data or the MXF file, for example, in the management table 13. Then, the analysis unit 12 transmits the analyzed content to the error control unit 18.

The error control unit 18 adds error correction code to the content transmitted from the analysis unit 12 in units of predetermined data size or block, and writes the content to the storage unit 14.

Such processing involving receiving and analyzing content in MXF file format transmitted from the source server 20, and then storing the content in the storage unit will be referred to as "recording" below.

Under the control of the control unit 11, the decoder 16 decodes video data of the content read from the storage unit 14, and outputs the decoded video data to an external video monitor, the network or the like.

In the case of playing video data thus recorded, the control unit 11 receives a command and data indicating, for example, identification information of the content, playback position and the like from the user interface unit 15 through the internal bus. Then, the control unit 11 reads the content stored in the storage unit 14 and determines what kind of playback processing is to be preformed for the content by referring to the analysis information in the management table 13. The control unit 11 reads playback information specifying the determined playback processing from the storage unit 14 and transmits the playback information and the content to the decoder 16.

The decoder 16 having received the content and the playback information of the content decodes the video data of the content in the MXF file format from the specified position according to the playback information, and outputs only a desired portion of the video data to the outside. During the decoding of the video data, the decoder 16 also performs error correction processing using the error correction code added by the error control unit 18 in the process of recording.

Next, the source server 20 will be explained. In particular, different points between the source server 20 and the recording server 10 will be described below.

The data interface unit 17 is a unit configured to receive a command from the recording server 20 and to transmit content to the recording server 20 through the network 30. The data interface unit 17 transmits packets of a file to the network 30.

The data interface unit 17 transmits a file designated by the recording server 10 to the recording server 10 through the network 30. The data interface unit 17 not only transmits an MXF file in the storage unit 14 from the head position of the file, but also transmits data from a position forwarded by a designated number of bytes from the head position of the file, for example, under the control of the control unit 11 according to a command and data transmitted from the recording server 10.

In the storage unit 14, multiple content files in MXF file format received from other sources through the data interface unit 17 are stored in advance.

Figure 2:
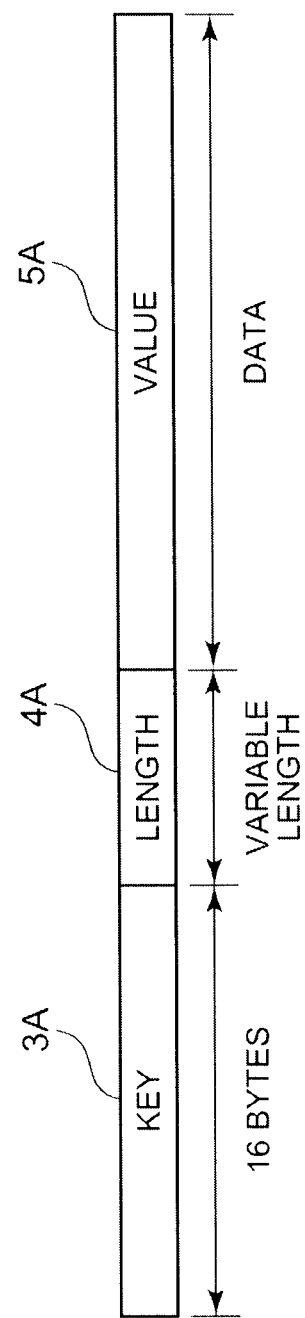
FIG. 2 is a basic structural diagram of an MXF file.

FIG. 2 is a basic structural diagram of an MXF file. The MXF file includes sets of three description elements of Key 3A, Length 4A and Value 5A, which appear repetitively. This is called a KLV coding scheme. In the Key 3A, an identification tag of data is written. In the Length 4A, information on data size such as a data length of Value data following the Length 4A. In the Value 5A, data actually desired to be stored in the MXF file is stored.

Figure 3:
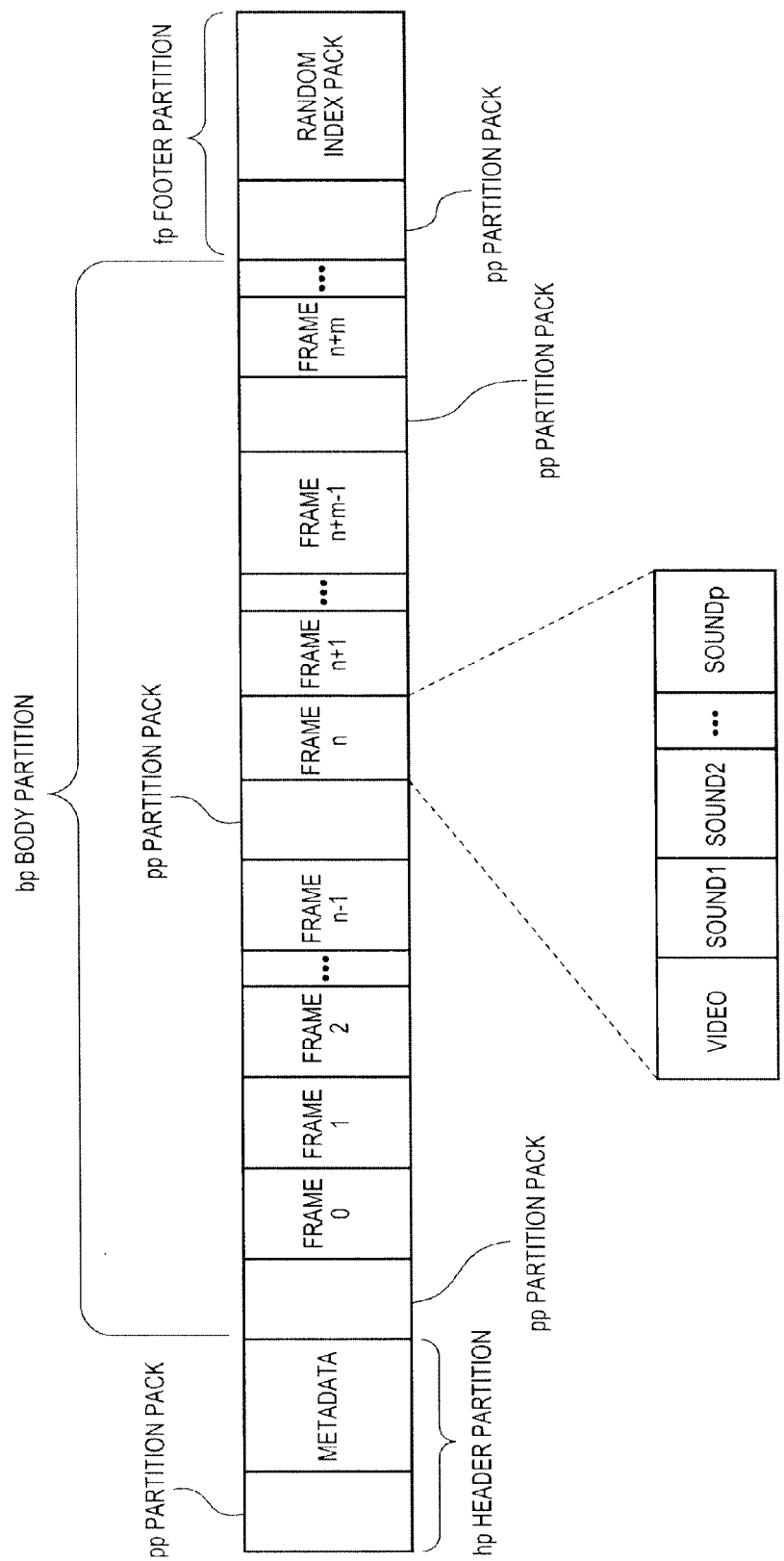
FIG. 3 shows an example of a logical structure of content (video signal) in MXF file format including video data.

FIG. 3 shows an example of a logical structure of content in MXF file format including video data. The MXF file is mainly divided into a header partition hp, a body partition by and a footer partition fp. The header partition hp is located at the head position of the MXF file and the footer partition fp is located at the tail end of the MXF file. The MXF file has a partitioned structure including a partition packs (hereinafter, abbreviated as PP), indicating a partition of data, at the head position of each of the header partition hp, the body partition by and the footer partition fp. Moreover, in the body partition bp, mostly the PP is often provided for every certain number of frames.

The header partition hp includes metadata.

The body partition by stores main data called Essence such as video data. In the body partition bp, content is divided by the PPs into groups in certain data units. For example, a frame n following a PP includes a set of an image data frame and audio data frames 1 to p corresponding to the image data frame. In the case of MPEG encoding, in the first frame n following the PP, multiple frames belonging to one GOP (group of pictures) are arranged in such a way that the I-frame is located at the head position.

The footer partition fp includes description of information serving as closing description of one MXF file of content. For example, the Random Index pack includes description of information indicating an offset value from the head position of each PP.

The above structure of the MXF file is set as default in the source server 20. Then, in the process of transferring an MXF file between servers, the MXF file is read sequentially from the head position in units of partitions by PPs), and is transmitted as packet data according to the FTP protocol.

The transfer time required to transfer the whole data from the head position to the end position depends on a transfer rate of a network between the servers. When a file is transferred within a studio, or when a file is transferred between a center station and a local station, a user desires to complete the file transfer within a short period of time. To meet this demand, the file transfer system and the file transfer method in the embodiment divides an MXF file by PPs and transfers the divided pieces of the MXF file in parallel. When an MXF file is divided by PPs, the MXF file can be divided without needing complicated data processing. In this way, the file transfer system and the file transfer method in the embodiment achieves file transfer within a short period of time.

Figure 4:
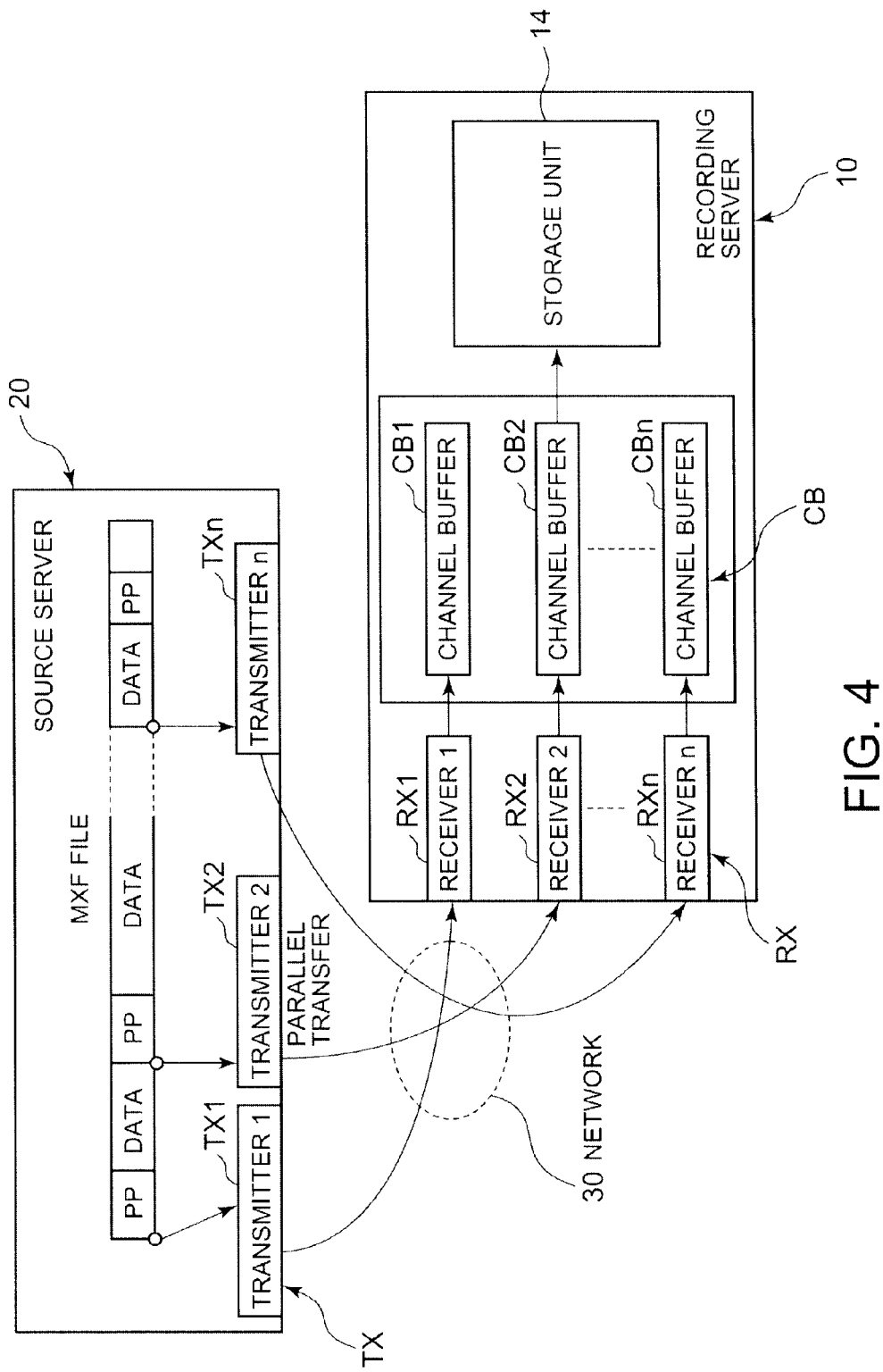
FIG. 4 is a conceptual diagram for explaining a concept of parallel transfer of an MXF file between servers.

FIG. 4 is a conceptual diagram for explaining a concept of parallel transfer of an MXF file between servers. The source server 20 performs parallel transfer of data pieces of the MXF file divided by the PPs and the PPs preceding the respective data pieces, sequentially from the first data piece, to the recording server 10 through transmitters TX1 to TXn included in the data interface unit 17. The recording server 10 receives the data pieces divided by the PPs, and the PPs preceding the data pieces, at receivers RX1 to RXn included in the data interface unit 17, and temporarily stores the data in channel buffers CB. The recording server 10 sequentially outputs the PP and the data pieces from the channel buffers CB in order from a channel buffer CB1, a channel buffer CB2, . . . , and then a channel buffer CBn, and sequentially writes the PPs and the data pieces to the storage unit 14. In this way, the file divided and then transmitted is reconstructed to be the original file.

The number of parallel channels n is determined by the number of communication channels that can be secured by both of the servers. The larger the number of parallel channels n, the shorter the transfer time. However, as the number of parallel channels n increases, the file reconstruction processing increases. For this reason, several channels are preferably usable as the parallel channels n. In addition, the number of parallel channels n is determined to be a number equal to the total number M of PPs or a number smaller than the total number M of PPs.

Figure 5:
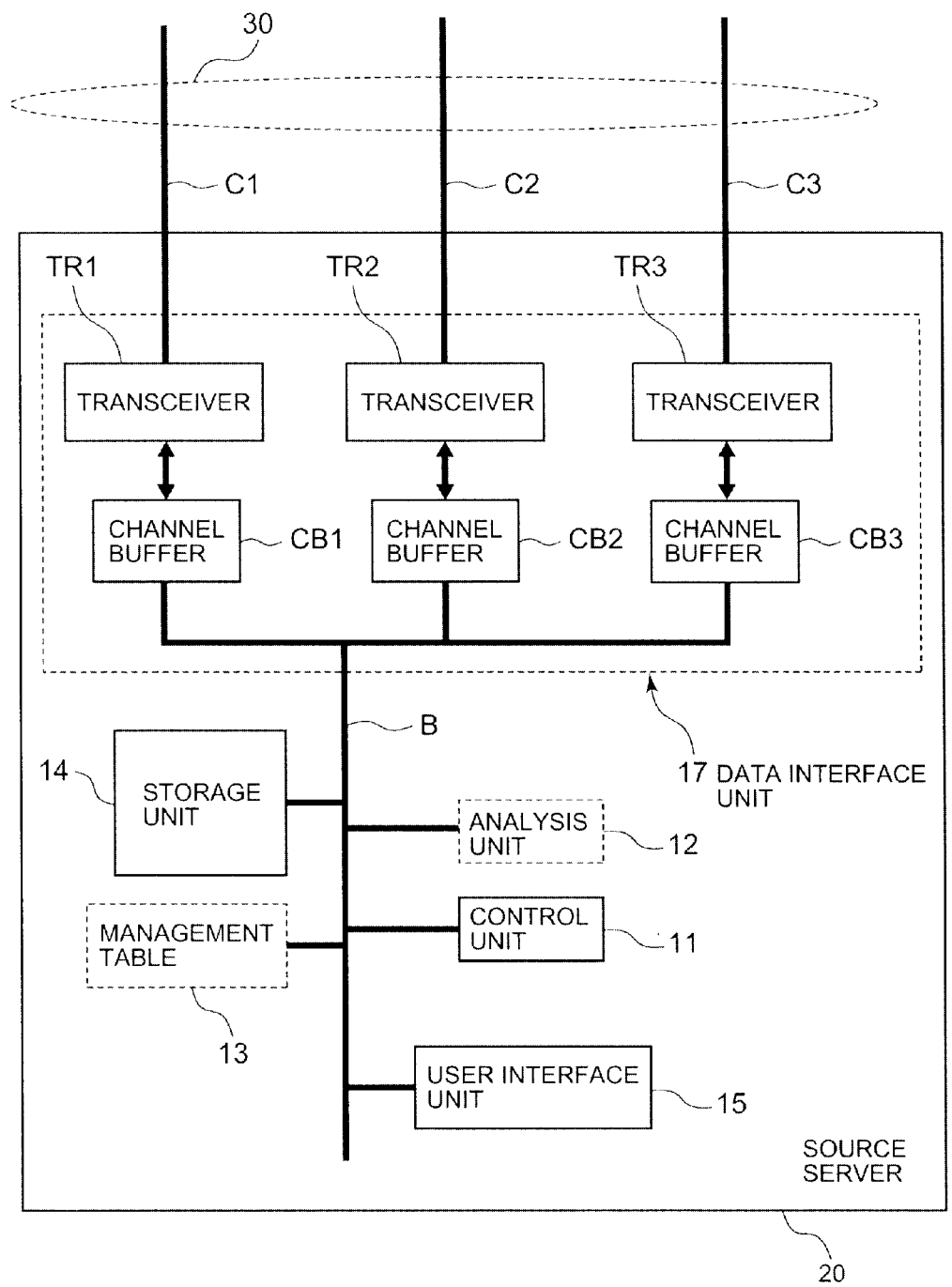
FIG. 5 is a functional block diagram for explaining an operation for file transmission and reception of a source server 20.
Figure 6:
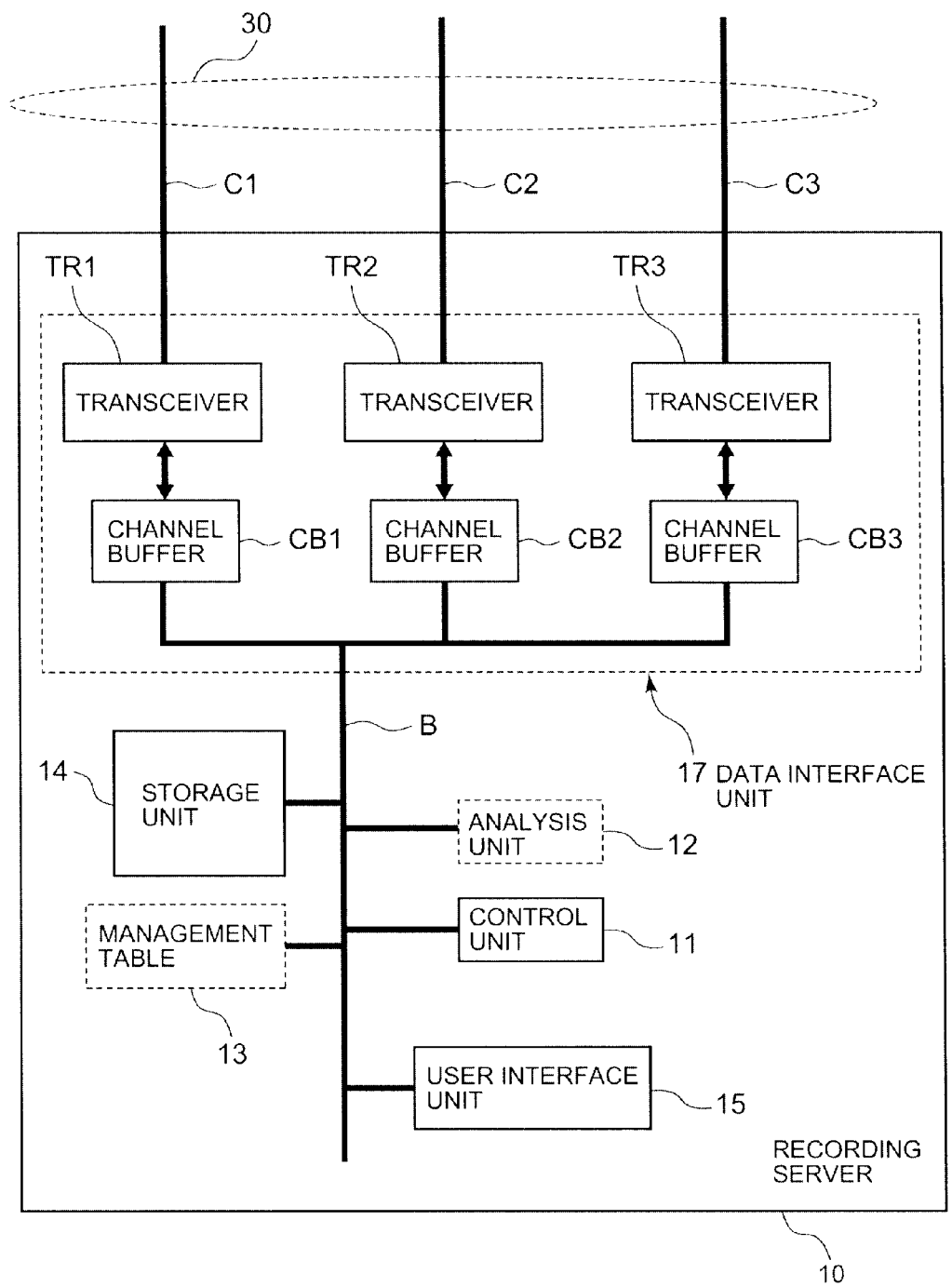
FIG. 6 is a functional block diagram for explaining an operation for file transmission and reception of a recording server 10.

FIGS. 5 and 6 are functional block diagrams for explaining operations for file transmission and reception of the source server 20 and the recording server 10. The recording server 10 and the source server 20 are connected to each other through the network 30. Here, the explanation is provided for the case where the network 30 transmits data through three channels C1, C2 and C3. The servers 10 and 20 each include transceivers TR1, TR2 and TR3 corresponding to the three channels, and channel buffers CB1, CB2 and CB3 connected to the respective transceivers TR1, TR2 and TR3, in the data interface unit 17.

When data is not transferred in parallel, that is, when data is transferred through single channel, the recording server 10 and the source server 20 each use only the transceiver TR1 and the channel buffer CB1. The other transceivers TR2 and TR3 and the other channel buffers CB2 and CB3a are in a stand-by state. The maximum number of transceivers mountable in each of the servers 10 and 20 is set in advance. Information such as the number of parallel channels, the number of transceivers, conditions of channels prepared as channels usable for transfer is inputted from the user interface unit 15 by the operator.

In the source server 20, the channel buffers CB1, CB2 and CB3 temporarily store PPs and data pieces to be transmitted by the transceivers TR1, TR2 and TR3, respectively, under the control of the control unit 11. In the recording server 10, the channel buffers CB1, CB2 and CB3 temporarily store the PPs and the data pieces received by the transceivers TR1, TR2 and TR3, respectively, under the control of the control unit 11. The transceiver TR1, TR2 and TR3 in the source server 20 communicates with the transceiver TR1, TR2 and TR3 in the recording server 10 through the transmission channel C1, C2 and C3, respectively. In this case, the both servers' transceivers with the same number become a pair each other. The PPs and data pieces are transferred by use of the FTP protocol from the transceivers TR1, TR2 and TR3 in the source server 20 to the transceivers TR1, TR2 and TR3 in the recording server 10. Since PPs and data pieces are transferred in parallel while maintaining a one-to-one relationship with one of the transmission channels, the PPs and data pieces received by the recording server 10 are arranged in the same order as that of the PPs and the data pieces transmitted by the source server 20. For this reason, the recording server 10 can easily reconstruct the file structure of the file transmitted by parallel transfer.

Firstly, an overview of the file transfer method is described. The operator inputs in advance the name of an MXF file to be transferred and setting information of channels for parallel transfer of the file, from the user interface unit 15 into the recording server 10 shown in FIG. 6. In this case, the number of channels for parallel transfer is set to three, for example. The control unit 11 in the recording server 10 sets address information of the transceiver TR1 in the source server 20 and the transceiver TR1 in the recording server 10 for the channel C1, for example, and establishes a communication path of IP communications between the two transceivers. The control unit 11 in the recording server 10 similarly establishes communication paths for the other two channels C2 and C3.

Then, the control unit 11 in the source server 20 allocates data pieces of the MXF file sequentially from the first piece, to the transceivers TR1, TR2 and TR3, and thereby sets up the parallel transfer. More specifically, the source server 20 transfers the PP and metadata following the PP in the header partition hp, the first PP and a data piece following the first PP, and the next PP and a data piece following the next PP in the body partition bP in parallel through the channels C1, C2 and C3. For the following data pieces, every time the parallel transfer is completed, the source server 20 arranges the next three sets of PPs and data pieces in the data sequence order and transfers the three sets in parallel. Note that, if an empty channel assigned no data to be transferred occurs in the parallel transfer of the last footer partition fp, the transfer through the empty channel is not performed.

To be more precise, the source server 20 that is a sender of the MXF file sequentially reads the PP and the metadata in the header partition hp, and then each of the data pieces partitioned by the PPs together with the PP preceding the data piece from the storage unit 14 according to an instruction from the control unit 11. The source server 20 allocates a first PP and the following data piece, a second PP and the following data piece, and a third PP and the following data piece to the channel buffers CB1, CB2 and CB3, respectively in that order, and then transmits the PPs and the data pieces through the channels C1, C2 and C3 via the transceivers TR1, TR2 and TR3 of the respective channels.

In the case of transferring a file from halfway, the source server 20 sequentially reads the PPs and the following data pieces from the storage unit 14 according to an instruction of the control unit 11, by firstly reading the PP and the metadata in the header partition hp, and thereafter sequentially reading the PPs and the following data pieces from a position forwarded by a designated number of bytes from the head position of the file, for example. After that, the source server 20 allocates the PPs and the data pieces to the channel buffers CB1, CB2 and CB3, and then transmits the PPs and the data pieces through the channels C1, C2 and C3 via the transceivers TR1, TR2 and TR3 of the respective channels.

The recording server 10 receives the PPs and the data pieces at the transceivers TR1, TR2 and TR3 through the channels C1, C2 and C3 and stores the PPs and the data pieces in the channel buffers CB1, CB2, and CB3 temporarily. Then, the recording server 10 writes and thus records the PPs and the data pieces, temporarily stored in the channel buffer CB1, CB2 and CB3, in the order of the channels to the storage unit 14. Since the order of the channels and the data sequence match with each other, the recording server 10 can execute the writing without needing complicated processing.

In this process, the three pairs of the corresponding transceivers TR1, TR2 and TR3 in the the source server 20 and the recording server 10 transfer the data temporarily stored in the channel buffers CB1, CB2 and CB3 in the source server 20, to the recording server 10 according to the IP protocol (FTP procedure). Upon completion of the transfer through the channel C1, the transceiver TR1 in the source server 20 receives a response signal indicating the transfer completion from the transceiver TR1 in the recording server 10. Then, the transceiver TR1 in the source server 20 makes a notification of the response signal to the control unit 11 in the source server 20 through an internal bus B.

Since data sizes of data pieces partitioned by the PPs are different from each other, the transfer is not simultaneously completed on the three channels. A compression rate of each frame of a video signal encoded in MPEG varies depending on conditions of the original video image constituting the frame screen. For this reason, a frame including a low compression rate video signal has a large data size, and thus requires a long time for data transfer.

Accordingly, upon receipt of the third response signal of the transfer completion after the parallel transfer of data sets on the three channels, the control unit 11 in the source server 20 starts the parallel transfer of the next data sets on the three channels. Note that, after completion of receiving the third data set, the recording server 10 writes the data sets to the storage unit 14 in the recording server 10. The data transfer from the source server 20 to the recording server 10 is completed upon completion of transfer of the footer partition fp. As a result, the parallel transfer can complete file transfer within a shorter period of time than a conventional single transfer.

Alternatively, in the parallel transfer, data does not always have to be partitioned by all the PPs, unlike the above case. The source server 20 may partition data by every 100th PP, for example, to form groups each including multiple sets of PPs and data pieces, and then may transfer the data in parallel in units of groups. To be more precise, the source server 20 forms a group by including first to 100th PPs and following data pieces, and sequentially transfers the PPs and data pieces in the group through the channel C1. In addition, the source server 20 forms another group by including 101st to 200th PPs and following data pieces, and performs parallel transfer of the PPs and data pieces in the group through the channel C2. Moreover, the source server 20 forms another group by including 201st to 300th PPs and following data pieces, and performs parallel transfer of the PPs and data pieces in the group through the channel C3. Thereafter, the source server 20 iterates this processing.

The control unit 11 controls the dividing of data into groups by every certain-numbered PP. The control unit 11 reads the PPs and the data pieces from the storage unit 14 and transfers the PPs and the data pieces to the channel buffer (for example, CB1, here) through the internal bus B. The control unit 11 monitors the internal bus B and controls the transfer of data to the channel buffer by counting the number of transferred PPs and data pieces.

This method can reduce the number of times of receiving responses for transfer completion from the transceivers in the recording server 10 in comparison with the case using the former transfer method described above. Accordingly, this method can reduce the transfer time by a time needed for response reception thus omitted.

In still another method, the control unit 11 in the source server 20 writes in advance the total number of PPs as random index (RI) information to the footer partition fp of an MXF file to be written to the storage unit 14. Then, when the source server 20 receives a transfer command, the control unit 11 reads the RI information, and divides the read total number of PPs by the number of parallel channels thereby to determine how many PPs are to be transmitted through each of the channels. In the case where the total number of PP to be transferred is 6000, for example, the control unit 11 allocates first to 2000th PPs and the data pieces to the channel buffer CB1, 2001st to 4000th PPs and the data pieces to the channel buffer CB2, and 4001st to 6000th PPs and the data pieces to the channel buffer CB3. If the channel buffers CB1, CB2 and CB3 temporarily store the whole data to be transferred in this way, the file transfer may be completed only in one session of parallel transfer.

In the above three methods, in the order presented herein, the data amount transmitted in one session of parallel transfer increases and the transfer time decreases, but thereby the needed capacity of each channel buffer increases.

Note that, the number of PPs transmitted in parallel may be different among the channels. When the total number of PPs is 5900, for example, the PPs may be transmitted in such a way that 2000 PPs are allocated to each of the first two channels, and 1900 PPs are allocated to the last one channel.

As has been described above, the file transfer system and the file transfer method in the present invention enable stream data converted as an MXF file to be easily transferred within a short period of time.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. A file transfer system comprising:
a network including first to n-th transmission channels, wherein n is an integer greater than or equal to 2;
a source server including:
a source server storage which stores a Material eXchange Format (MXF) file, the MXF file including broadcast content and data pieces partitioned by partition packs (PPs);
first to n-th transmitters respectively connected to the first to n-th transmission channels in the network; and
a controller which writes a total number of the PPs associated with the MXF file, as random index information of a footer partition of the MXF file, to the source server storage when the MXF file is written to the source server storage, reads the total number of the PPs from the random index information of the MXF file, divides the total number of the PPs by n, which corresponds to the number of the transmission channels in the network, in order to determine a transmission number of the PPs, which each of the first to n-th transmitters transmit, sequentially reads each of the PPs and associated data pieces of the data pieces of the MXF file from the source server storage, sequentially allocates the PPs of the transmission number and the associated data pieces that are read to each of the first to n-th transmitters, starting with the first transmitter and ending with the n-th transmitter, and performs parallel transfer of the PPs and the associated data pieces allocated to the first to n-th transmitters through the first to n-th transmission channels, when the MXF file is transferred; and
a recording server including a recording server storage, and first to n-th receivers respectively connected to the first to n-th transmission channels, the recording server being configured to receive the PPs and the associated data pieces, which are transmitted by the first to n-th transmitters, by the first to n-th receivers, respectively, and to write the PPs and the associated data pieces received by the first to n-th receivers to the recording server storage in sequential order starting with the first receiver and ending with the n-th receiver.

2. A file transfer method for a file transfer system to transfer a Material eXchange Format (MXF) file, which includes broadcast content and data pieces partitioned by partition packs (PPs), from a source server to a recording server through a network, the method comprising:
writing a total number of the PPs of the MXF file, as random index information of a footer portion of the MXF file, to a source server storage of the source server when the MXF file is written to the source server storage;
connecting, through the network, which includes first to n-th transmission channels, wherein n is an integer greater than or equal to two, first to n-th transmitters of the source server with respective first to n-th receivers of a recording server;
reading the total number of the PPs from the random index information of the MXF file;
determining a transmission number of the PPs for each of the first through n-th transmitters by dividing the total number of PPs by n, which corresponds to the number of the transmission channels in the network;
sequentially reading each of the PPs and associated data pieces of the data pieces of the MXF file from the source server storage;
sequentially allocating the PPs of the transmission number and the associated data pieces that are read to each of the first to n-th transmitters, starting with the first transmitter and ending with the n-th transmitter;
transmitting the PPs and the associated data pieces allocated to the first to n-th transmitter in parallel, by the first to n-th transmitters, through the first to n-th transmission channels in the network;
receiving the PPs and the associated data pieces, which are transmitted by the first to n-th transmitters, by the first to n-th receivers, respectively; and
writing the PPs and the associated data pieces, which are received by the first to n-th receivers, to the recording server storage in sequential order starting with the first receiver and ending with the n-th receiver.

* * * * *